United States Patent
Kushwaha et al.

(10) Patent No.: US 10,037,213 B2
(45) Date of Patent: Jul. 31, 2018

(54) SYSTEM AND METHOD FOR ADJUSTING BOOT INTERFACE FREQUENCY

(71) Applicant: FREESCALE SEMICONDUCTOR, INC., Austin, TX (US)

(72) Inventors: Prabhakar Kushwaha, Delhi (IN); Poonam Aggrwal, Delhi (IN); Rajkumar Agrawal, Noida (IN); Prabhjot Singh, Noida (IN)

(73) Assignee: NXP USA, INC., Austin, TX (US)

( * ) Notice: Subject to any disclaimer, the term of this patent is extended or adjusted under 35 U.S.C. 154(b) by 169 days.

(21) Appl. No.: 15/268,639

(22) Filed: Sep. 19, 2016

(65) Prior Publication Data
US 2018/0081695 A1    Mar. 22, 2018

(51) Int. Cl.
| | |
|---|---|
| *G06F 9/4401* | (2018.01) |
| *G06F 1/08* | (2006.01) |
| *G06F 15/78* | (2006.01) |
| *G06F 12/02* | (2006.01) |

(52) U.S. Cl.
CPC .............. *G06F 9/4403* (2013.01); *G06F 1/08* (2013.01); *G06F 12/0246* (2013.01); *G06F 15/7821* (2013.01); *G06F 15/7853* (2013.01)

(58) Field of Classification Search
None
See application file for complete search history.

(56) References Cited

U.S. PATENT DOCUMENTS

| | | | |
|---|---|---|---|
| 5,305,453 A | 4/1994 | Boudry et al. | |
| 5,784,599 A | 7/1998 | Elkhoury | |
| 6,055,194 A * | 4/2000 | Seo | G11C 7/1018 |
| | | | 365/194 |
| 6,449,727 B1 * | 9/2002 | Toda | G06F 13/4243 |
| | | | 711/167 |
| 6,535,986 B1 | 3/2003 | Rosno et al. | |
| 6,711,533 B1 | 3/2004 | Aymard et al. | |
| 7,427,027 B2 | 9/2008 | Elhamjas et al. | |
| 8,266,611 B2 | 9/2012 | Song | |
| 2006/0174100 A1 * | 8/2006 | Park | G06F 9/4406 |
| | | | 713/2 |
| 2008/0162770 A1 * | 7/2008 | Titiano | G06F 1/3203 |
| | | | 710/309 |
| 2012/0272088 A1 | 10/2012 | Lee | |

(Continued)

Primary Examiner — Paul Yen
(74) Attorney, Agent, or Firm — Charles E. Bergere (57) ABSTRACT

A system-on-chip includes a processing core and a memory controller connected between the core and an external memory. A clock divider receives an internal clock signal and outputs a divided clock signal. The memory controller uses the divided clock signal to establish an interface communication frequency with the memory. A boot control logic circuit, connected to the clock divider, compares a check data pattern to a predefined data pattern read from the memory by the memory controller at the interface frequency. When the predefined and check data patterns do not match, the boot control logic circuit instructs the clock divider to adjust the divided clock signal to change the interface frequency, after which the predefined data pattern reading and comparison are repeated, and when the predefined and check data patterns match, the memory controller reads a boot program, executed by the core, from the memory at the interface frequency.

12 Claims, 7 Drawing Sheets

(56) References Cited

U.S. PATENT DOCUMENTS

2014/0232434 A1* 8/2014 Koazechi ............... G06F 1/08
327/40
2015/0199520 A1* 7/2015 Woolley ............. G06F 21/575
713/2

* cited by examiner

SYSTEM AND METHOD FOR ADJUSTING BOOT INTERFACE FREQUENCY

BACKGROUND

The present invention is directed to booting of a system-on-chip (SOC) and, more particularly, to adjustments to boot interface frequency when the SOC boots from an external memory.

An SOC often includes a processing core that boots from an external memory, such as a NOR flash or other type of flash memory. Typically, the processing core will be in communication with a flash memory controller that is connected to the external memory by an interface bus. However, during the boot process, the memory interface speed is unknown to the SOC. Memory interface speeds can vary from system to system, so the interface controller must be run at the slowest speed during booting.

Running the interface controller at the slowest possible speed has numerous drawbacks, not the least of which is the clear fact that booting will be slow. It also under-utilizes system capabilities, as the default interface frequency is the same for all external memories, regardless of the memory speed. However, increasing the default boot frequency can result in failures when reading external memories with longer delays. In general, selecting a default interface frequency is a challenge because the SOC input clock, board delays, and memory access times can vary from system to system.

It is therefore desirable to provide a system and method for adjusting the frequency of a boot interface to an external memory that allows for both fast and reliable booting.

BRIEF DESCRIPTION OF THE SEVERAL VIEWS OF THE DRAWINGS

The present invention is illustrated by way of example and is not limited by embodiments thereof shown in the accompanying figures, in which like references indicate similar elements. Elements in the figures are illustrated for simplicity and clarity and have not necessarily been drawn to scale.

In the drawings.

DETAILED DESCRIPTION

In one embodiment, the present invention provides an SOC configured to boot from an external memory storing a boot program and a predefined data pattern. The SOC includes a processing core configured to boot according to the boot program stored in the external memory and a memory controller connected between the processing core and the external memory. The memory controller is connected to the external memory via an interface bus. A clock divider receives an internal clock signal and outputs a divided clock signal, wherein the memory controller uses the divided clock signal to establish an interface frequency of communication with the external memory. A boot control logic circuit, connected to the clock divider, compares a check data pattern to the predefined data pattern, wherein the predefined data pattern is read from the external memory by the memory controller at the interface frequency established by the divided clock signal. When the predefined and check data patterns do not match, the boot control logic circuit instructs the clock divider to adjust the divided clock signal to change the interface frequency, after which reading of the predefined data pattern and comparison to the check data pattern are repeated, and when the predefined and check data patterns match, the memory controller reads the boot program from the external memory at the interface frequency defined by the divided clock signal.

In another embodiment, the present invention provides a method of booting an SOC according to a boot program stored in an external memory. The SOC includes a processing core, a memory controller connected with the external memory via an interface bus, a clock divider, and a boot control logic circuit. The method includes (a) powering on the processing core, and (b) reading, by the memory controller, a predefined data pattern from the external memory according to an interface frequency. The interface frequency is based on a signal output by the clock divider. The method further includes (c) comparing, by the boot control logic circuit, a check data pattern to the read predefined data pattern, (d) when the check and predefined data patterns do not match, instructing the clock divider to adjust the clock signal to change the interface frequency, and repeating steps (b)-(c), and (e) when the check and predefined data patterns match, reading, by the memory controller, the boot program from the external memory according to the interface frequency.

Figure 1:
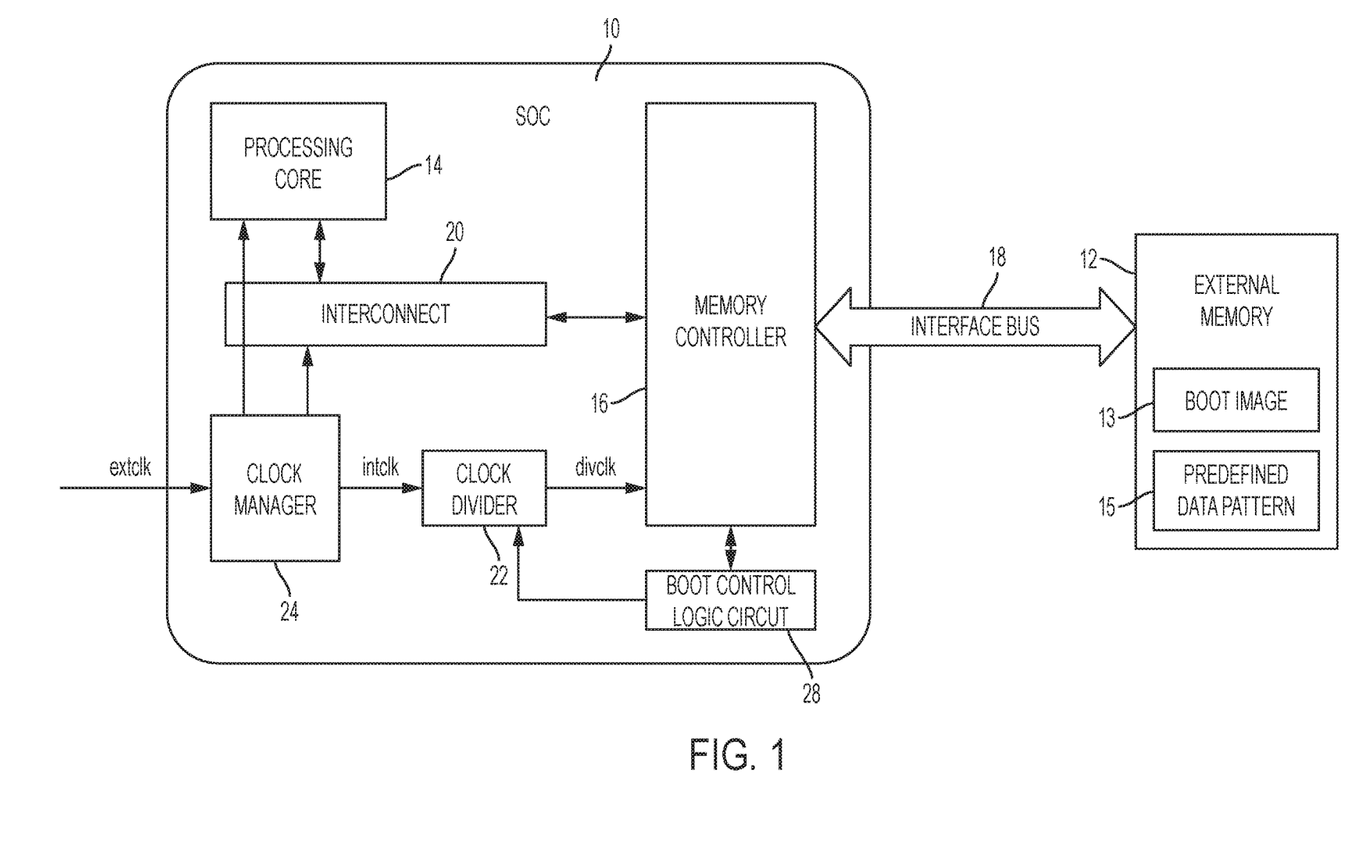
FIG. 1 is a schematic diagram of an SOC connected to an external memory in accordance with a first embodiment of the present invention.

Referring now to the drawings, wherein the same reference numerals are used to designate the same components throughout the several figures, there is shown in FIG. 1 a first preferred embodiment of an SOC 10 configured to boot from an external memory 12. The external memory 12 is preferably a NOR flash memory, although NAND or other types of flash memory, electrically erasable programmable read-only memory (EEPROM), or the like may be used as well. The external memory 12 stores a boot program 13 used by a processing core 14 of the SOC 10 to boot on start-up. The external memory 12 further stores a predefined data pattern 15, the use of which will be explained in further detail below.

The SOC 10 further includes a memory controller 16 that is preferably connected to the external memory 12 via an interface bus 18, which can include a cable or may be in the form of a direct socket connection. The memory controller 16 is preferably a flash memory controller, an integrated flash controller (IFC), or the like. The memory controller 16 is also connected to the processing core 14, preferably by a standard interconnect 20, such as a commercially available COMPUTER CONTROL BUS (CCB), available from SANYO.

The memory controller 16 must establish a frequency of communication with the external memory 12 in order to appropriately read the contents thereof. To do so, the memory controller 16 preferably uses a divided clock signal divclk output from a clock divider 22. The clock divider 22 preferably uses a clock signal intclk internal to the SOC 10 in order to derive the appropriate divided clock signal divclk. In preferred embodiments, the SOC 10 preferably further includes a clock manager 24 that receives a clock signal extclk that is generated external to the SOC 10 in order to produce and output the internal clock signal intclk used by the clock divider 22.

The SOC 10 also includes a boot control logic circuit 28 that communicates with the clock divider 22 for instructing the clock divider 22 to adjust the divided clock signal divclk. The boot control logic circuit 28 is also preferably in communication with the memory controller 16.

Figure 2:
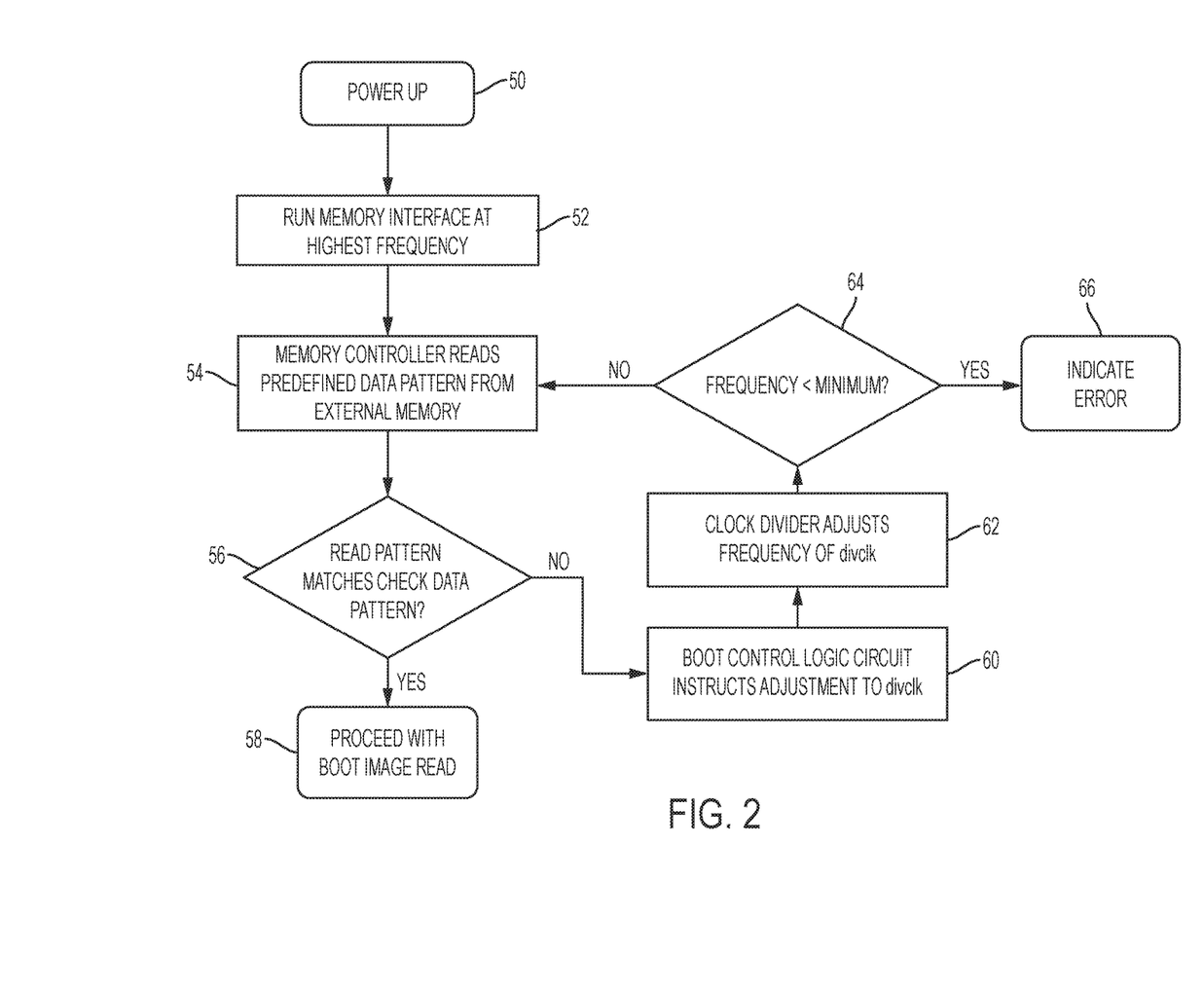
FIG. 2 is a flow chart of an exemplary method for booting the SOC of FIG. 1.

FIG. 2 is a flow chart of an exemplary method for booting the SOC 10 of FIG. 1 according to the present invention. At step 50, the SOC 10, and in particular the processing core 14, is powered on. Initially, at step 52, the memory controller 16 is set to communicate with the external memory 12 at the highest available frequency. However, other initial frequency set points for communication, such as the lowest available frequency, most commonly used frequency, or the like, may also be used. As explained above, the communication frequency is set by appropriately configuring the divided clock signal divclk.

At step 54, before reading the boot program 13, the memory controller 16 reads the predefined data pattern 15 from the external memory 12 at the set communication frequency. At step 56, the boot control logic circuit 28 compares the read predefined data pattern 15 with a check data pattern. When the check and predefined data patterns match, indicating that data is being read from the external memory 12 at the proper frequency, booting may continue as usual, including step 58 in which the memory controller 16 reads the boot program 13 from the external memory 12 according to the set interface frequency.

However, in the event that the boot control logic circuit 28 does not find a match between the predefined and check data patterns, at step 60, the boot control logic circuit 28 instructs the clock divider 22 to adjust the divided clock signal divclk, which in turn adjusts the interface frequency. In this particular embodiment, where the initial frequency was the highest available frequency, the frequency of the divided clock signal divclk is lowered. The clock divider 22 performs the adjustment at step 62.

It is preferred that the frequency be monitored, and if at step 64 the divided clock signal divclk frequency falls below a predetermined threshold level in the present embodiment (or exceeds or is otherwise outside of a predetermined acceptable operating range in other embodiments), an error is preferably output to the SOC 10 at step 66. If the adjusted frequency is within acceptable limits, on the other hand, the process returns to step 54, wherein the memory controller 16 again reads the predefined data pattern 15 from the external memory 12, this time at the new interface frequency. The process preferably repeats until communication occurs at the proper frequency for the external memory 12. Step 60 can be performed at the clock divider 22, by the boot logic control circuit 28, or other circuitry within the SOC 10.

Figure 3:
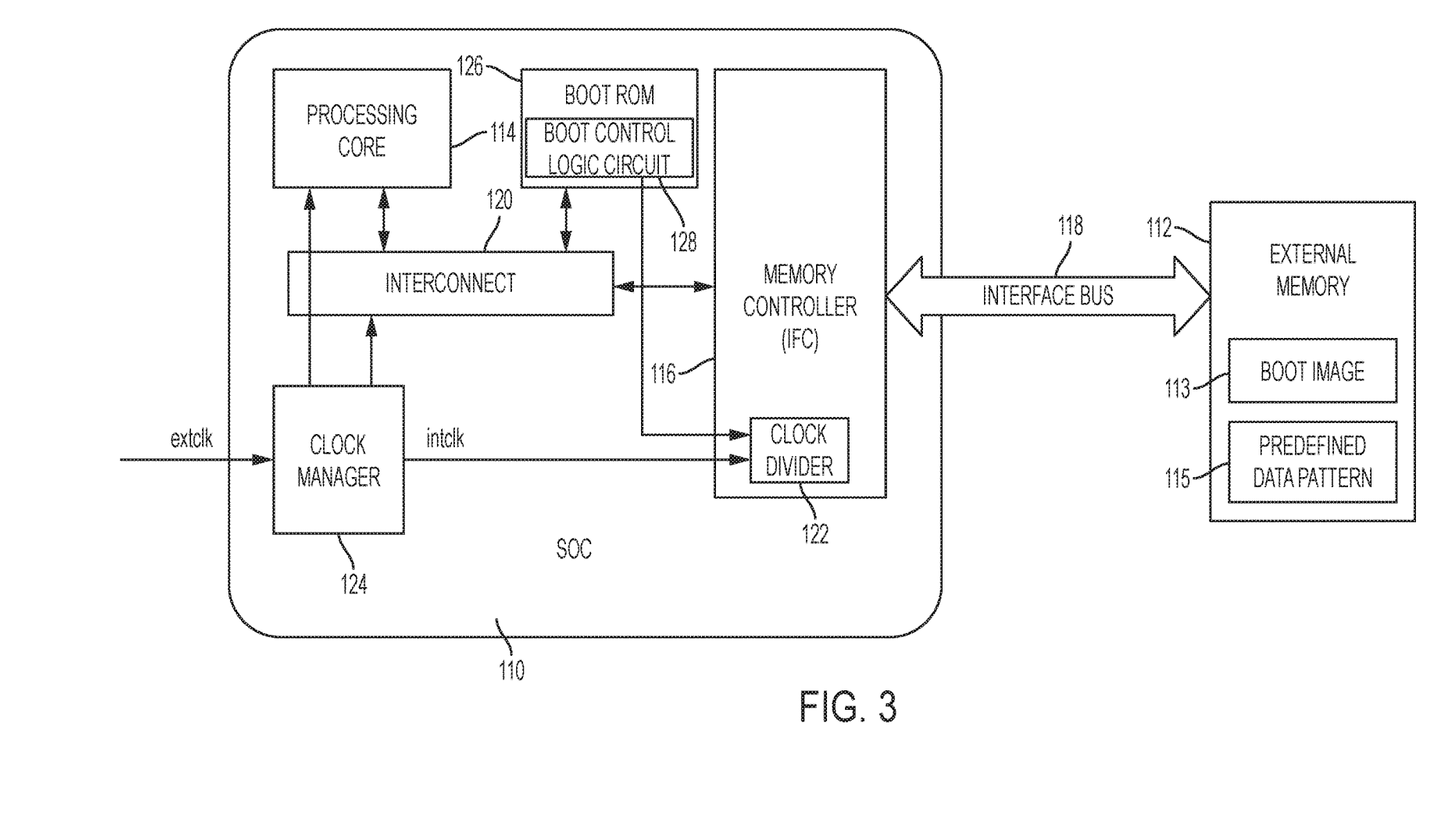
FIG. 3 is a schematic diagram of an SOC connected to an external memory in accordance with a second embodiment of the present invention.

Referring now to FIG. 3, a second embodiment of the SOC is shown. The second embodiment is similar to the first embodiment described above. Like numerals have been used for like elements, except the 100 series numerals have been used for the second embodiment. Accordingly, a complete description of the second embodiment has been omitted, with only the differences being described.

The SOC 110 in FIG. 3 further includes a Boot Read-Only-Memory (ROM) 126, which is connected to the processing core 114 via the interconnect 120. The Boot ROM 126 preferably stores a set of initial boot instructions for the processing core 114, which would be executed following powering-on of the SOC 110. In the present embodiment, the boot logic control circuit 128 is part of the Boot ROM 126. Further, the memory controller 116 in the present embodiment is preferably an IFC. The clock divider 122 is preferably part of the IFC 116.

Figure 4:
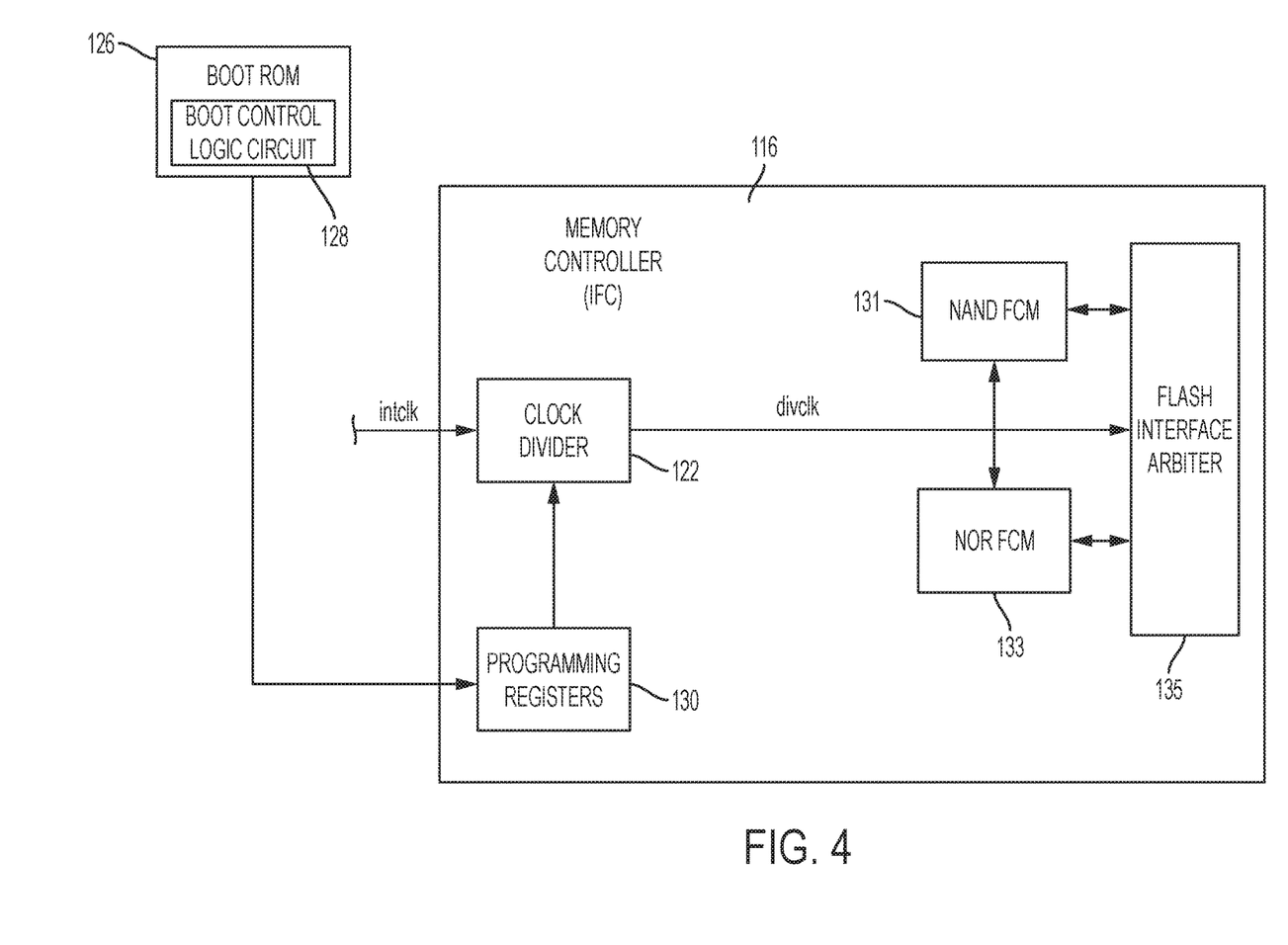
FIG. 4 is a schematic diagram of a portion of the SOC and memory of FIG. 3, with additional detail shown for the memory controller.

FIG. 4 is a schematic view of a portion of the SOC 110 of FIG. 3, with more detail regarding the internal components of the IFC 116. The clock divider 122 receives the internal clock signal intclk from the clock manager 124 (FIG. 3) and outputs the divided clock signal divclk within the IFC 116, where it may be used by conventional IFC 116 components, such as NAND and NOR flash control machines (FCMs) 131, 133 and a flash interface arbiter 135. In one embodiment, the logic of the IFC 116 is partitioned into independent IFCs 131, 133 for interfacing with external NAND Flash and NOR Flash to allow for control of NAND Flash and NOR Flash separately. In the second embodiment, the boot logic control circuit 128 communicates with programming registers 130, from which the clock divider 122 obtains its instructions for adjusting the divided clock signal divclk frequency.

Figure 5:
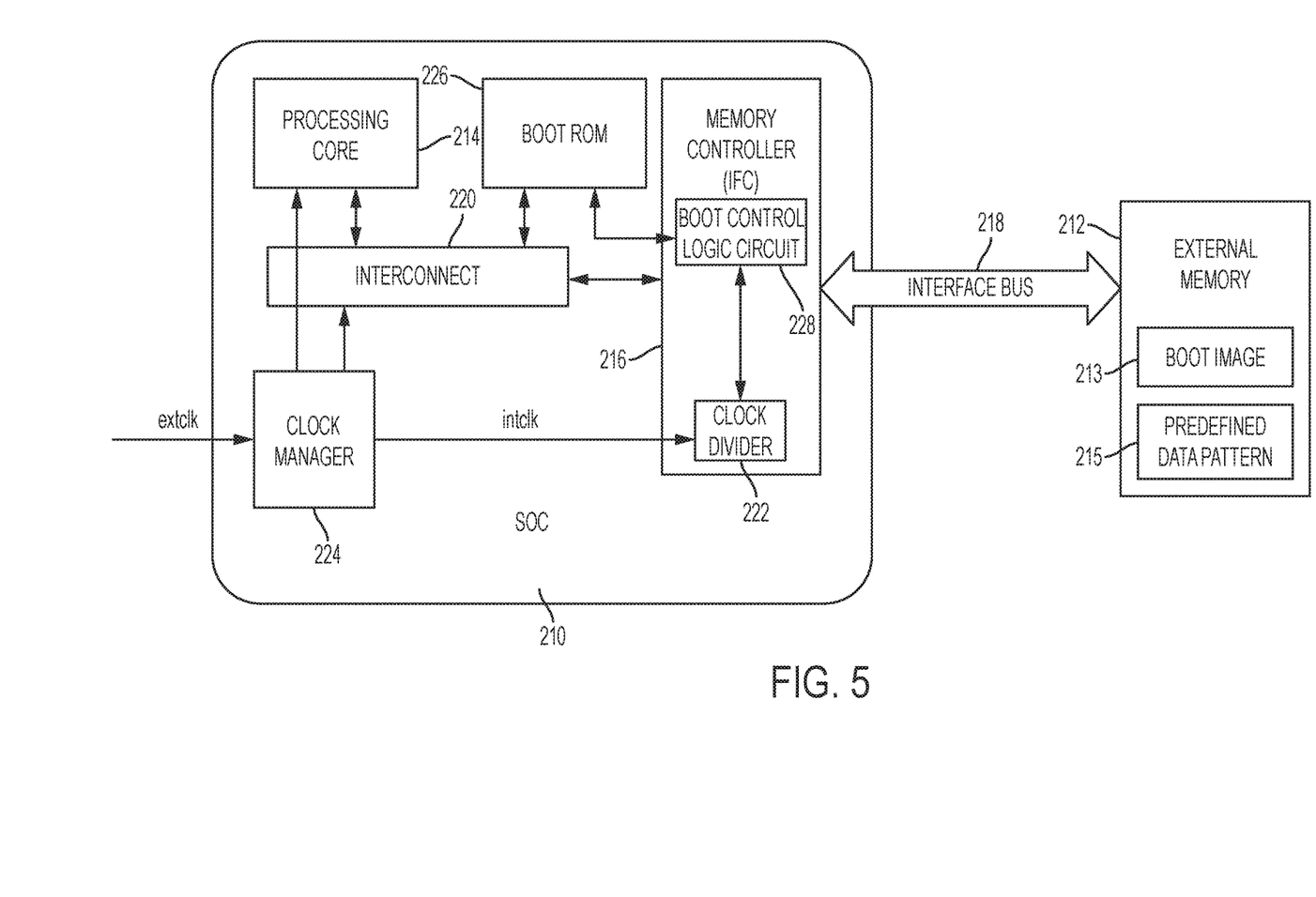
FIG. 5 is a schematic diagram of an SOC connected to an external memory in accordance with a third embodiment of the present invention.

Referring to FIG. 5, a third embodiment of the SOC is shown. The third embodiment is similar to the first and second embodiments described above. Like numerals have been used for like elements, except the 200 series numerals have been used for the third embodiment. Accordingly, a complete description of the third embodiment has been omitted, with only the differences being described. The third embodiment differs from the second embodiment primarily in that the boot control logic circuit 228 is located in the IFC 216 along with the clock divider 222.

Figure 6:
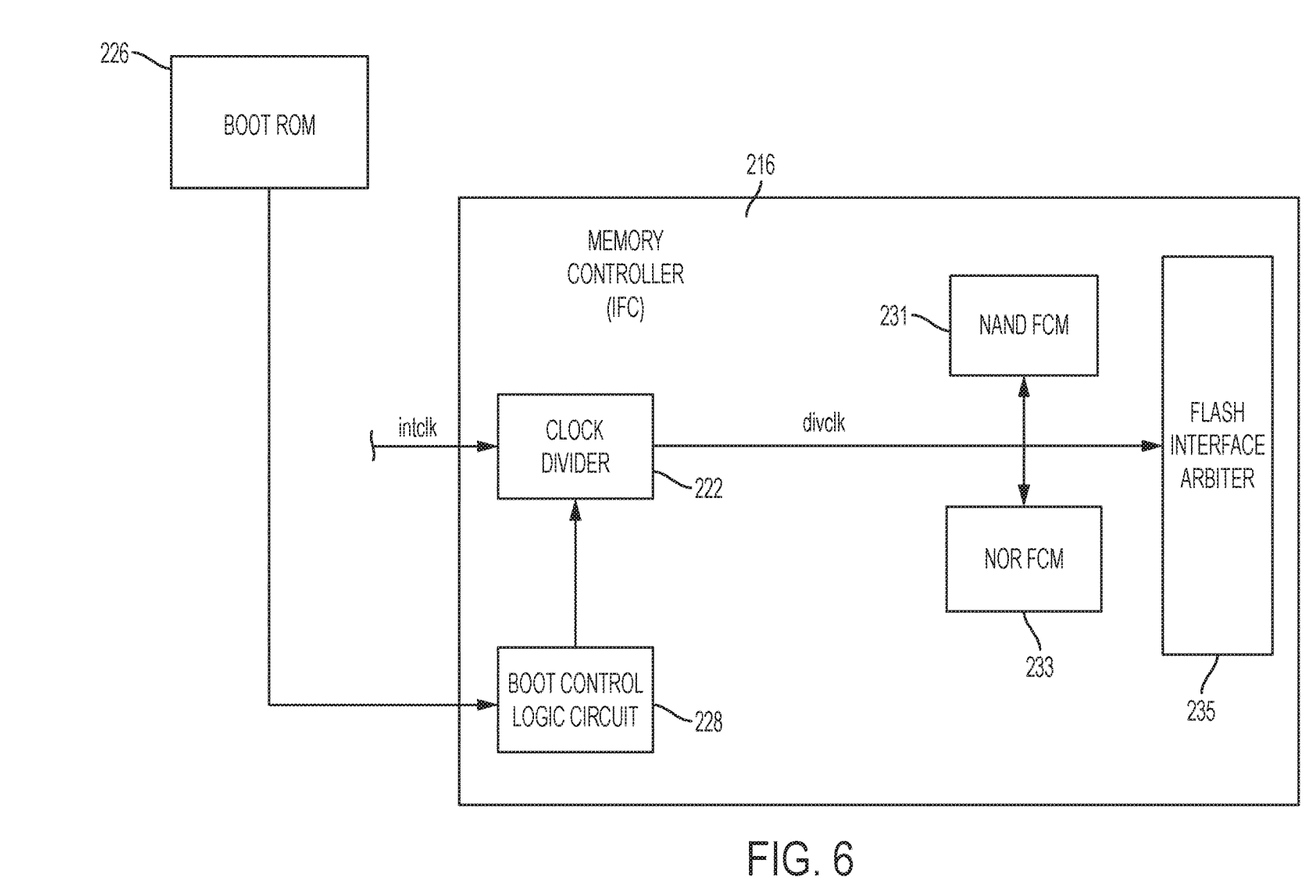
FIG. 6 is a schematic diagram of a portion of the SOC and memory of FIG. 5, with additional detail shown for the memory controller.

FIG. 6 is a schematic view of a portion of the SOC 210 of FIG. 5, with more detail regarding the internal components of the IFC 216. The boot control logic circuit 228 within the IFC 216 is in communication with the Boot ROM 226, and provides instructions directly to the clock divider 222.

Figure 7:
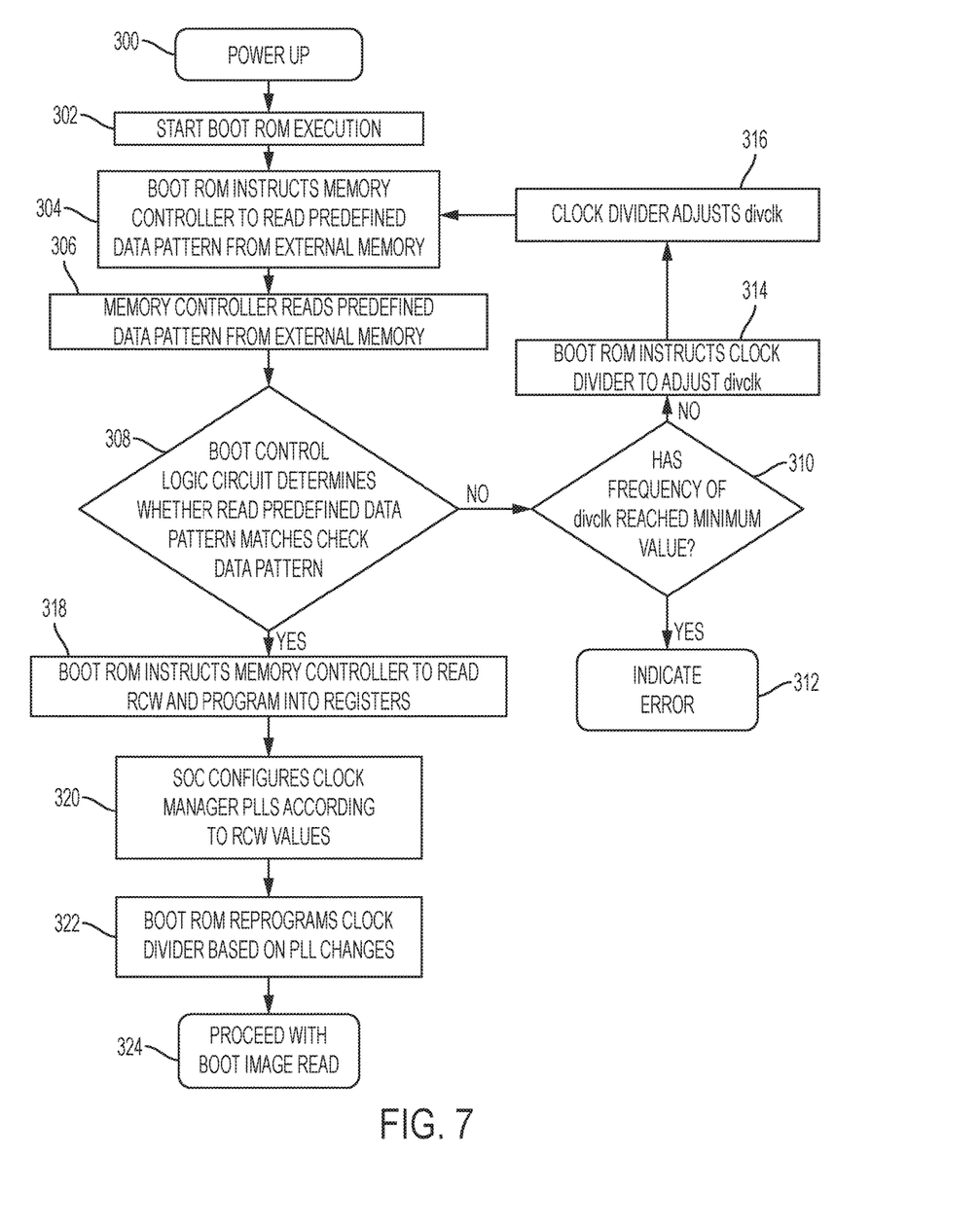
FIG. 7 is a flow chart of an exemplary method for booting the SOC of FIG. 3 or 5.

FIG. 7 is a flow chart of an exemplary method for booting the SOCs 110, 210 of FIGS. 3 and 5 according to the present invention. Using the second embodiment in FIG. 3 as an example, at step 300, the SOC 110, and in particular the processing core 114, is powered on. At step 302, the SOC 110 begins Boot ROM 126 execution, that is, the processing core 114 retrieves and executes the initial booting instructions from the Boot ROM 126. At step 304, the Boot ROM 126 sends instructions to the IFC 116 to read the predefined data pattern 115 from the external memory 112, which the IFC 116 does at step 306 at the set communication frequency. As before, the preferred initial communication frequency is the highest available frequency, although other frequencies may be used as well.

At step 308, the boot control logic circuit 128, which in the second embodiment is located within the Boot ROM 126, compares the read predefined data pattern 115 with a check data pattern. The check data pattern is preferably hardcoded in the Boot ROM 126 or another system memory, but may also be software or user programmable.

In the event that the boot logic control circuit 128 does not find a match, at step 310, the Boot ROM 126 or the boot logic control circuit 128 may check to see if the divided clock signal divclk frequency is still within acceptable limits, e.g., whether the divided clock signal divclk frequency has reached a predetermined minimum value. If so, an error is preferably indicated to the SOC 110 at step 312. Otherwise, the Boot ROM 126 or the boot logic control circuit 128 program the clock divider 122 to adjust the divided clock signal divclk to change the interface frequency at step 314. The clock divider 122 performs the instructed adjustment at step 316, and the process returns to step 304.

If, on the other hand, the check and predefined data patterns match at step 308, indicating that data is being read from the external memory 112 at the proper frequency, booting may proceed as is conventional. In the embodiment shown in FIG. 7, this optionally includes a step 318 wherein the Boot ROM 126 requests the IFC 116 to read reset configuration words (RCW) from the external memory 112. The read RCWs may be programmed into the programming registers 130 of the IFC 116. In step 320, the SOC 110 may configure the clock manager 124 based on the RCWs. Specifically, the clock manager 124 preferably includes a plurality of phase-locked loop circuits (not shown), which the SOC 110 configures according to the RCWs. Notably, this configuration step changes the internal clock signal intclk that is output by the clock manager 124 to the clock divider 122.

Consequently, at step 322, the Boot ROM 126 preferably reprograms the clock divider 122 one last time to compensate for the internal clock signal intclk adjustments attributable to the PLL configuration changes. This allows the proper interface frequency to be maintained. At step 324, the IFC 116 reads the boot program 113 from the external memory 112 according to the set interface frequency, and booting continues.

Using the techniques described herein, the difficulty in predefining a default interface frequency is removed, since the frequency selection is dynamic and can begin at higher speeds, thereby ensuring that faster memories will boot at acceptable speeds.

In the foregoing specification, the invention has been described with reference to specific examples of embodiments of the invention. It will, however, be evident that various modifications and changes may be made therein without departing from the broader spirit and scope of the invention as set forth in the appended claims.

It is understood that the drawings and accompanying description may omit certain features of, for example, the SOC, memory controller, external memory, and the like, but that one of ordinary skill in the art would recognize such omitted features as conventional and not critical to understanding the embodiments of the invention or operation thereof.

The connections discussed may be any type of connection suitable to transfer signals from or to the respective nodes, units or devices, for example via intermediate devices. Accordingly, unless implied or stated otherwise, the connections may be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, a plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Those skilled in the art will recognize that boundaries between the above-described operations are merely illustrative. The multiple operations may be combined into a single operation, a single operation may be distributed in additional operations and operations may be executed at least partially overlapping in time. Further, alternative embodiments may include multiple instances of a particular operation, and the order of operations may be altered in various other embodiments.

The terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

In the claims, the word 'comprising' or 'having' does not exclude the presence of other elements or steps then those listed in a claim. Further, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The fact that certain measures are recited in mutually different claims does not indicate that a combination of these measures cannot be used to advantage.

The invention claimed is:

1. A system-on-chip (SOC) configured to boot from an external memory storing a boot program and a predefined data pattern, the SOC comprising:
   a processing core configured to boot according to the boot program stored in the external memory;
   a memory controller connected between the processing core and the external memory, wherein the memory controller is connected to the external memory via an interface bus;
   a clock manager that receives an external clock signal and generates an internal clock signal, wherein the clock manager includes a plurality of phase-lock-loop (PLL) circuits;
   a clock divider that receives the internal clock signal and outputs a divided clock signal, wherein the memory controller uses the divided clock signal to establish an interface frequency for communication with the external memory;
   a Boot Read-Only-Memory (ROM), connected to the processing core, for storing a set of initial boot instructions executed by the processing core before executing the boot program stored in the external memory; and
   a boot control logic circuit, connected to the clock divider, that compares a check data pattern to the predefined data pattern, wherein the predefined data pattern is read from the external memory by the memory controller at the interface frequency established by the divided clock signal, and wherein:

(i) when the predefined and check data patterns do not match, the boot control logic circuit causes the clock divider to adjust the divided clock signal to change the interface frequency, after which reading of the predefined data pattern and comparison to the check data pattern are repeated, and (ii) when the predefined and check data patterns match, the memory controller reads the boot program from the external memory at the interface frequency defined by the divided clock signal and reads reset configuration words from the external memory, the clock manager uses the reset configuration words to configure the PLL circuits, and the Boot ROM reprograms the clock divider according to the PLL circuit configurations such that the memory controller reads the boot program using the interface frequency at which the check and predefined data patterns were determined to match.

2. The SOC of claim 1, wherein the memory controller is an integrated flash controller.

3. The SOC of claim 2, wherein at least one of the clock divider and the boot control logic circuit is part of the integrated flash controller.

4. The SOC of claim 1, wherein the boot control logic circuit is part of the Boot ROM.

5. The SOC of claim 1, wherein changing the interface frequency involves lowering the interface frequency.

6. The SOC of claim 5, wherein the boot control logic circuit determines whether a frequency of the divided clock signal is lower than a predetermined minimum frequency, and outputs an error signal when the divided clock signal frequency is lower than the predetermined minimum frequency.

7. The SOC of claim 1, wherein the memory controller is a flash memory controller.

8. A method of booting a system-on-chip (SOC) according to a boot program stored in an external memory, the SOC including a processing core, a memory controller connected with the external memory via an interface bus, a clock divider, a boot control logic circuit, a Boot Read-Only-Memory (ROM), connected to the processing core, for storing a set of initial boot instructions, and a clock manager that generates an input clock signal, wherein the clock manager includes a plurality of phase-lock-loop (PLL) circuits, the method comprising:
(a) powering on the processing core and executing, by the processing core, the initial boot instructions;
(b) reading, by the memory controller, a predefined data pattern from the external memory according to an interface frequency, the interface frequency being based on a clock signal output by the clock divider;
(c) comparing, by the boot control logic circuit, a check data pattern to the read predefined data pattern;
(d) when the check and predefined data patterns do not match, instructing the clock divider to adjust the clock signal to change the interface frequency, and repeating steps (b)-(c);
(e) when the check and predefined data patterns match, reading, by the memory controller, the boot program from the external memory according to the interface frequency, and requesting, by the Boot ROM, the memory controller to read reset configuration words from the external memory;
(f) configuring the PLL circuits in the clock manager using the read reset configuration words; and
(g) reprogramming, by the Boot ROM, the clock divider according to the PLL circuit configurations such that the memory controller reads the boot program using the interface frequency at which the check and predefined data patterns were determined to match.

9. The method of claim 8, further comprising sending, by the Boot ROM, instructions to the memory controller to read the predefined data pattern from the external memory.

10. The method of claim 8, wherein the boot control logic circuit is part of the Boot ROM.

11. The method of claim 8, wherein adjusting the clock signal output by the clock divider involves lowering a frequency of the clock signal.

12. The method of claim 11, further comprising outputting an error when the frequency of the clock signal output by the clock divider falls below a predetermined threshold level.

* * * * *